(12) United States Patent
Ribbens et al.

(10) Patent No.: US 10,145,243 B2
(45) Date of Patent: Dec. 4, 2018

(54) PLANETARY ROTARY ENGINE WITH ROTARY RING VALVES

(71) Applicant: Planetary Rotor Engine Company, Shelburne, VT (US)

(72) Inventors: William Bennett Ribbens, Ann Arbor, MI (US); Ronald Joseph Fredricks, Jenison, MI (US)

(73) Assignee: Planetary Rotor Engine Company, Shelburne, VT (US)

( * ) Notice: Subject to any disclaimer, the term of this patent is extended or adjusted under 35 U.S.C. 154(b) by 178 days.

(21) Appl. No.: 15/035,138

(22) PCT Filed: Nov. 6, 2014

(86) PCT No.: PCT/US2014/064304
§ 371 (c)(1),
(2) Date: May 6, 2016

(87) PCT Pub. No.: WO2015/069867
PCT Pub. Date: May 14, 2015

(65) Prior Publication Data
US 2016/0281595 A1  Sep. 29, 2016

Related U.S. Application Data

(60) Provisional application No. 61/962,371, filed on Nov. 6, 2013.

(51) Int. Cl.
*F01C 1/28* (2006.01)
*F01C 21/18* (2006.01)
(Continued)

(52) U.S. Cl.
CPC ............. *F01C 1/28* (2013.01); *F01C 21/108* (2013.01); *F01C 21/186* (2013.01); *F02B 53/02* (2013.01);
(Continued)

(58) Field of Classification Search
CPC .................................. F01C 1/28; F01C 21/186
See application file for complete search history.

(56) References Cited

U.S. PATENT DOCUMENTS

| 710,756 | A | 10/1902 | Colbourne |
| 2,097,881 | A | 11/1937 | Hopkins |
| (Continued) | | | |

FOREIGN PATENT DOCUMENTS

| JP | 57173514 A | 10/1982 |
| JP | 10311224 A | 11/1998 |
| (Continued) | | |

OTHER PUBLICATIONS

International Search Report and Written Opinion completed Feb. 17, 2015, from corresponding International Application No. PCT/US2014/064304.

(Continued)

*Primary Examiner* — Mary A Davis
(74) *Attorney, Agent, or Firm* — Gardner, Linn, Burkhart & Ondersma LLP

(57) ABSTRACT

A rotary engine includes a housing and elliptical rotors mounted to rotor shafts for rotation within a chamber of the housing. A valve disk mounted to a rotor shaft includes a port passing between first and second sides. A valve plate includes a bore defining a cylindrical sidewall for rotationally receiving the valve disk. The valve disk includes a groove disposed in a wall, and includes a ring member disposed in the groove that contacts the sidewall of the bore when the valve disk is disposed in the bore. The apparatus may include multiple valve disks disposed in separate bores to operate as exhaust or intake valves. Circumferential channels may be included in the bore sidewalls within which the ring members are disposed.

20 Claims, 11 Drawing Sheets

(51) Int. Cl.
  *F01C 21/10* (2006.01)
  *F02B 53/02* (2006.01)
  *F02B 53/00* (2006.01)
  *F02B 25/26* (2006.01)

(52) U.S. Cl.
  CPC .............. *F02B 25/26* (2013.01); *F02B 53/00* (2013.01); *F02B 2053/005* (2013.01); *Y02T 10/17* (2013.01)

(56) References Cited

U.S. PATENT DOCUMENTS

| | | |
|---|---|---|
| 2,410,341 A | 10/1946 | Delamere |
| 3,439,654 A | 4/1969 | Campbell, Jr. |
| 3,584,984 A | 6/1971 | Majkowski et al. |
| 3,809,026 A | 5/1974 | Snyder |
| 3,844,256 A | 10/1974 | Ishikawa et al. |
| 3,922,120 A | 11/1975 | McCullough et al. |
| 3,990,410 A | 11/1976 | Fishman |
| 4,627,395 A | 12/1986 | Tadokoro et al. |
| 4,934,325 A | 6/1990 | Snyder |
| 5,341,782 A | 8/1994 | McCall et al. |
| 6,139,290 A | 10/2000 | Masterson |
| 6,224,358 B1 | 5/2001 | Musser |
| 6,722,127 B2 | 4/2004 | Scuderi et al. |
| 7,011,469 B2 | 3/2006 | Sanderson et al. |
| 7,644,695 B2 | 1/2010 | Chadwick |
| 8,056,528 B2 | 11/2011 | Chadwick |
| 8,356,585 B2 | 1/2013 | Hathaway et al. |
| 2005/0268881 A1 | 12/2005 | O'Connor |
| 2009/0308347 A1 | 12/2009 | Hathaway et al. |

FOREIGN PATENT DOCUMENTS

| | | |
|---|---|---|
| JP | 2007522369 T | 8/2007 |
| KR | 20070005440 A | 1/2007 |
| RU | 2316660 C2 | 2/2008 |
| RU | 2251624 C2 | 10/2008 |
| WO | 2002/070878 A1 | 9/2002 |
| WO | 2005/024200 A2 | 3/2005 |

OTHER PUBLICATIONS

Western Michigan University; Wayne Jr., Russell W.; "Design of a Single Cylinder, Planetary Rotary Engine", Jul. 2004, pp. 1-25.
Western Michigan University; "The Second Research Experiences for Undergraduates Symposium", Jul. 15, 2004. (See "Design of a Single Cylinder, Planetary Rotary Engine" by Wayne Jr., Russell W. pp. 52-57).
European Search Report from corresponding European Patent Application No. 14860422, completed Jun. 22, 2017.

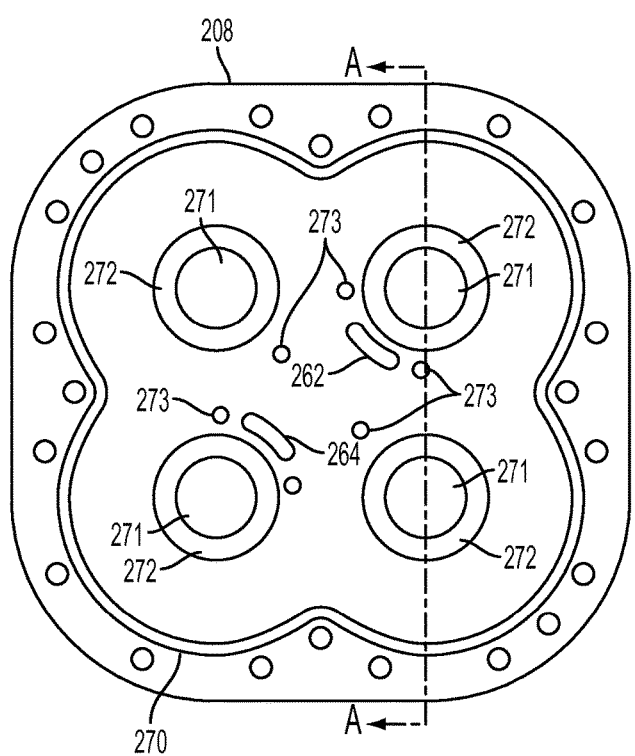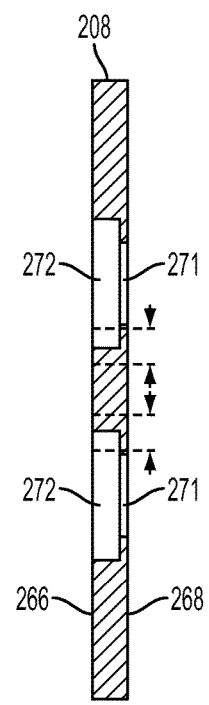
FIG. 7A
FIG. 7B

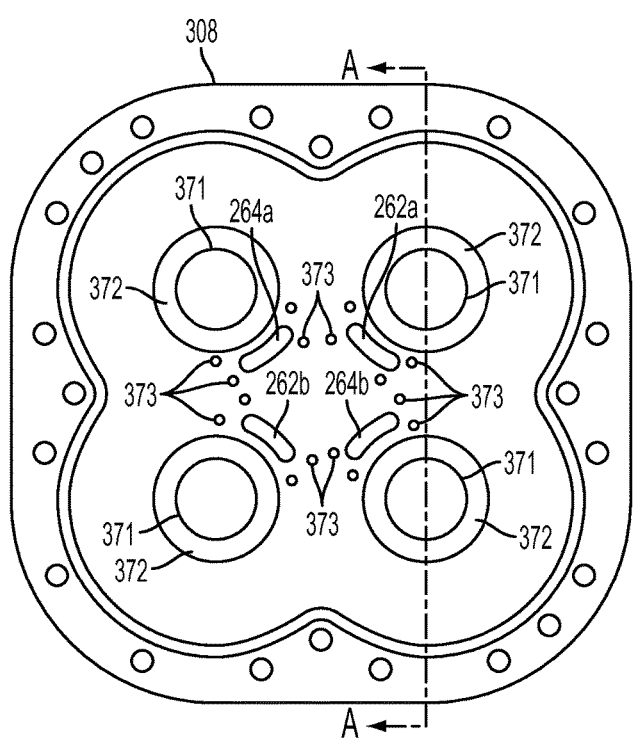 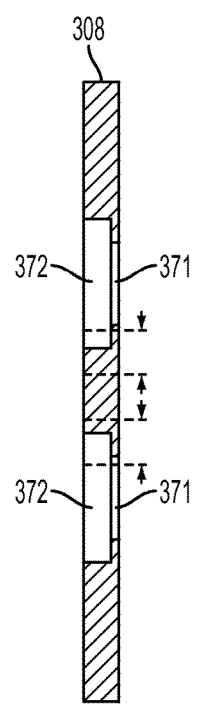
FIG. 12A
FIG. 12B

PLANETARY ROTARY ENGINE WITH ROTARY RING VALVES

CROSS REFERENCE TO RELATED APPLICATION

The present application is a 371 national phase application of PCT Application No. PCT/US2014/064304, which claims priority of U.S. provisional application Ser. No. 61/962,371 filed Nov. 6, 2013, by William B. Ribbens and Ronald J. Fredricks for PLANETARY ROTARY ENGINE WITH ROTARY RING VALVES TO MINIMIZE VALVE LEAKAGE EFFECTS, which are hereby incorporated herein by reference in their entireties.

BACKGROUND AND FIELD OF THE INVENTION

The present invention is directed to rotary apparatuses, and is disclosed below as a rotary engine useable as a combustion engine. In particular, the present invention is directed toward an improved valving system for intake and/or exhaust.

Rotary or planetary rotary engines include multiple rotors rotating about parallel rotor axes in the same direction and at the same speed in relative planetary motion. A planetary rotary engine is built using at least three, and typically four, elliptical shaped rotors rotating synchronously on parallel shafts. Both two-stroke and four-stroke planetary rotary engines may be provided with intake, compression, power, and exhaust phases being defined by relative rotor position during rotation. Various rotary engine configurations are disclosed, for example, in U.S. Pat. Nos. 2,097,881, 2,410,341, 3,809,026, 3,439,654, 6,139,290, and 6,224,358.

U.S. Pat. No. 8,356,585 discloses a planetary rotary engine having a charge compression system, as well as alternative embodiments for rotary valves. In an embodiment there disclosed, the combustion or inner chamber is formed by four rotors themselves with the stack of valve plate, bearing plate and end plate, moving from closest to furthest from the inner chamber, serving as an end seal on either side. The outer chamber(s) are formed by the rotors and their housing along with the above intake and exhaust side plate stacks. The rotary valves comprise two or more cut-out arcuate disks per valve in which the arcuate cuts of the two disks per valve overlap to form a rotating intake or exhaust port. Depending on the amount of overlap this rotating port has a characteristic butterfly shape. During intake or exhaust the port connects an associated intake or exhaust manifold on one side of the two disks with passages leading to the central chamber on the other side. Both the port's effective size/duration and the timing of when it is open for intake or exhaust can be varied dynamically under computer control using various disclosed techniques.

SUMMARY OF THE INVENTION

The present invention provides a rotary apparatus having an improved valve system, and in particular is useable as a rotary engine. The improved valve system, referred to as a rotary ring valve or ring valve, may be used for both intake and exhaust valves to prohibit unwanted leakage and blow-by of the air-fuel mixture during compression and ignition. The ring valves comprise a disk equipped with a snap-in ring set in slots in the disk around the periphery of the disk. The disks are provided with cutouts or ports, such as semicircular cutouts, used for intake or exhaust. The disks and rings rotate in counter-bored holes machined in a ring valve plate.

According to an aspect of the present invention, a rotary apparatus or engine includes a housing and multiple elliptical rotors that are mounted to rotor shafts for rotation within a chamber of the housing. A valve disk is mounted to a rotor shaft for rotation with the shaft, with the valve disk having a port passing between a first and second side. A valve plate includes a bore defining a cylindrical sidewall for rotationally receiving the valve disk. The valve disk includes a groove disposed in a radial edge wall, and includes a ring member disposed in the groove with the ring member contacting the sidewall of the bore when the valve disk is disposed in the bore.

The apparatus may include multiple valve disks disposed in separate bores of the valve plate to operate as exhaust or intake valves, with the ports comprising intake or exhaust ports. Circumferential channels may be included in the sidewalls of the bores within which the ring members are disposed. The valve plate may comprise first and second plate members that cooperatively define the bore when mated together, with the circumferential channel located where the first and second valve plate members engage together.

The valve plate includes one or more intake or exhaust passages extending from the valve disk receiving bores to an inner side of the valve plate to enable intake air and or air-fuel to enter the housing chamber, and allow exhaust to exit from the housing chamber, by way of rotational alignment of the ports of the valve disks with the passages of the valve plate. The passages may angle inwardly from the bores to the inner side of the valve plate.

The valve plate may be mounted directly to the housing, with a bearing plate disposed over the valve plate. The bearing plate will then also include one or more ports or passages, comprising intake or exhaust passages for enabling intake or exhaust to pass through the bearing plate, valve disks, and valve plate. In a particular embodiment the intake/exhaust passages and ports in the valve plate, valve disks and/or bearings comprise arcuate apertures, and may be of varying size.

In particular embodiments the valve disks may be mounted to the rotor shafts for selective relative rotational movement of said valve disk with respect to said rotor shaft such that the rotational alignment of the valve disk port with the valve plate passage is adjustable by relative movement of the valve disk on the rotor shaft. This can be used to obtain variable valve timing, as well as to achieve variable valve indexing or phasing, such as when more than one valve disk is used for intake or more than one valve disk is used for exhaust. In a particular embodiment of variable valving the valve disks are mounted to the rotor shafts via helical keyways and keys.

The rotary ring valve valving system of the present invention for the intake and/or exhaust of a rotary engine offers significantly lower unwanted leakage and blow-by of the air-fuel mixture during compression and ignition than other rotary valve systems. The higher the inner chamber pressure the tighter the snap-in rings seal the disks from blow-by around their edges. That is, the rings press tighter against the valve plates' counter-bore walls the higher the combustion chamber pressure becomes. This inhibits lifting of the ring valve disks off the seats in their associated counter-bore wells. However side wall friction due to disc rotation is minimized because the snap-in rings inherently present minimum surface area (edges only) to the counterbore walls and the rings can be easily lubricated by an oil spray.

These and other objects, advantages, purposes and features of this invention will become apparent upon review of the following specification in conjunction with the drawings.

BRIEF DESCRIPTION OF THE DRAWINGS

FIG. 7A is a top plan view of a bearing plate in accordance with the present invention that may be installed on the intake/exhaust valve plate of FIG. 6A;

FIG. 7B is a side sectional view of the bearing plate of FIG. 7A along the line A-A in FIG. 7A;

FIG. 12A is a top plan view of a bearing plate in accordance with the present invention that may be installed on the intake/exhaust valve plate of FIG. 11A;

FIG. 12B is a side sectional view of the bearing plate of FIG. 12A along the line A-A in FIG. 12A;

DESCRIPTION OF THE PREFERRED EMBODIMENTS

Figure 1:
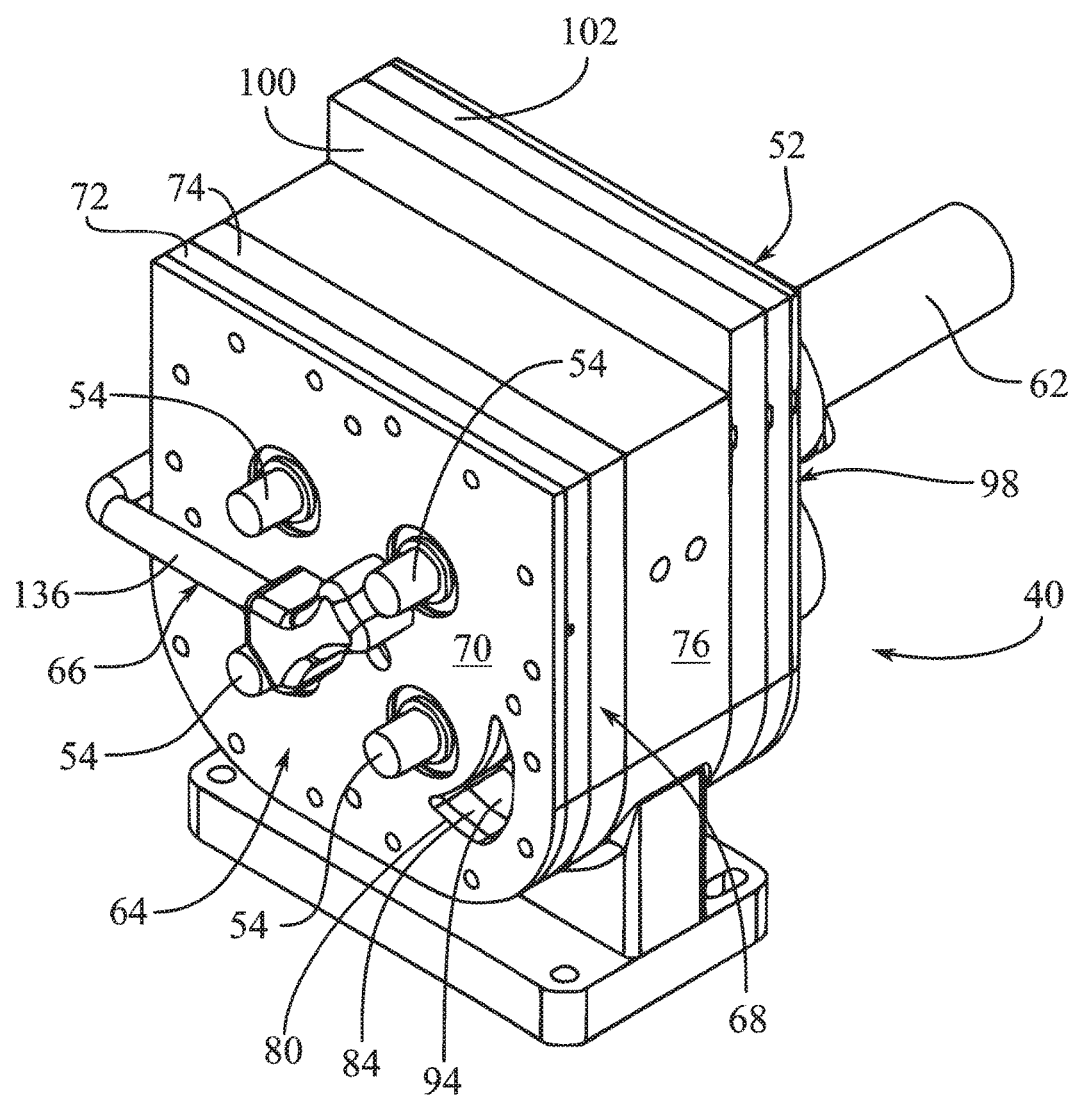
FIG. 1 is an intake side perspective view of a prior art planetary rotary engine.

The present invention will now be described with reference to the accompanying figures, wherein the numbered elements in the following written description correspond to like-numbered elements in the figures. As discussed further below, the present invention is directed toward a rotary ring valve system for use or applied to a rotary engine, such as a rotary combustion engine. By way of background, an exemplary rotary engine is illustrated at 40 in FIG. 1, where engine 40 is disclosed in U.S. Pat. No. 8,356,585, which is commonly owned by Planetary Rotary Engine Company of Burlington, Vt. and is incorporated by reference herein. Engine 40 includes multiple rotors 44 and a charge compression system for compressing a charge of air and/or an air and fuel mixture that is precompressed by rotation of the rotors 44. Engine 40 also includes a compression insert member 48 located within combustion chamber 46 that occupies both a portion of the combustion chamber 46 volume and provides rigidity to engine 40.

Engine 40 includes an exhaust side 52 and an intake side 64. As understood from FIGS. 2 and 3, engine 40 includes four separate rotors 44 mounted on separate shafts 54. Drive gears (not shown) are mounted to shafts 54 to power a drive output shaft (not shown). An exhaust manifold 62 is in communication with combustion chamber 46 of engine 40.

The intake side 64 of engine 40 is shown in FIG. 1, which side includes a charge intake manifold 66 and discloses the opposite ends of rotor shafts 54. Intake side 64 of engine 40 includes an intake end wall which in the illustrated embodiment comprises an intake end wall assembly 68. Intake end wall assembly 68 includes an intake cover plate 70, an intake bearing plate 72, and an intake valve plate 74 mounted to a housing block 76 of engine 40. Bearings (not shown) are mounted on rotor shafts 54 and are retained in bearing plate 72 for each shaft 54. Intake cover plate 70 includes a compression intake port 80 for allowing a charge of air or air and fuel mixture to be delivered into the combustion chamber 46 of engine 40 for the charge compression system. Bearing plate 72 also includes a compression intake port 84 that aligns with compression intake port 80 of intake cover plate 70.

Exhaust side 52 of engine 40 includes an exhaust end wall which in the illustrated embodiment comprises an exhaust end wall assembly 98 including an exhaust valve plate 100 and an exhaust bearing plate 102. Exhaust valve plate 100 is mounted to housing block 76 such that housing block 76 is sandwiched between intake valve plate 74 and exhaust valve plate 100.

Figure 2:
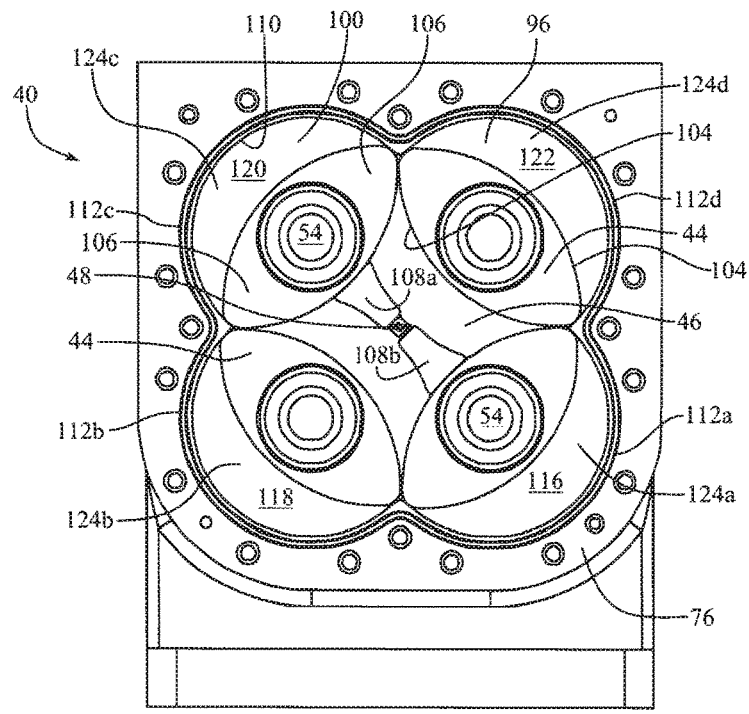
FIGS. 2 and 3 are plan views of the planetary rotary engine of FIG. 1 viewed from the intake side shown with intake plate portions removed and disclosing orientations of the four rotors where the internal combustion chamber is maximized (FIG. 2) and minimized (FIG. 3)
Figure 3:
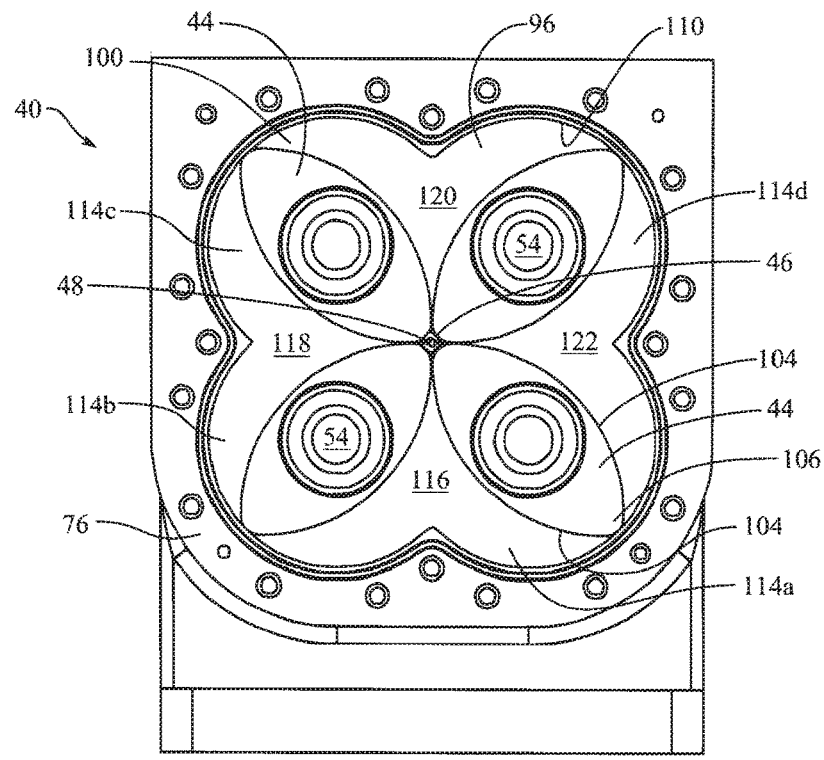

Referring to FIGS. 2 and 3, rotors 44 of engine 40 have an elliptical cross sectional profile and opposite sidewalls 104. Each rotor 44 includes two distally opposed lobes 106 along the long axis of the rotor profile. Also shown is exhaust valve plate 100 mounted to the back of housing block 76 and the exhaust valve ports 108a, 108b of exhaust valve plate 100, with the compression insert 48 centered between exhaust valve ports 108. Housing block 76 includes an internal sidewall 110 such that housing chamber 96 is defined by intake valve plate 74, exhaust valve plate 100, and internal sidewall 110 of housing block 76.

In operation rotors 44 all rotate in the same direction that being clockwise viewed from the orientation of FIGS. 2 and 3. Housing chamber 96 is subdivide into four overlapping rotor chambers or chamber portions 114a, 114b, 114c, 114d that are partially defined by respective chamber wall portions 112, with each rotor 44 rotating within a separate rotor chamber 114. Along with intake valve plate 74 and exhaust valve plate 100, rotors 44 define an inner chamber, which is a combustion chamber 46 in the illustrated embodiment, having an inner chamber volume. Intake valve plate 74, exhaust valve plate 100, outer chamber wall portions 114 and the portions of rotors 44 not exposed to combustion chamber 46 define four outer chamber volumes 116, 118, 120, 122. The volume of inner chamber 46 and outer chamber volumes 116, 118, 120, 122 alternatingly increase and decrease in volume during rotation of rotors 44. The volume of inner chamber 46 is maximized when the rotors 44 are oriented with their long axes orthogonal relative to one another, such as substantially as shown in FIG. 2, in which orientation the four outer chamber volumes 116, 118, 120, 122 are minimized. Conversely, the volume of inner chamber 46 is minimized and the four outer chamber volumes 116, 118, 120, 122 are maximized when the long axes of diagonally opposed rotors 44 are aligned as shown in FIG. 3.

Figure 4C:
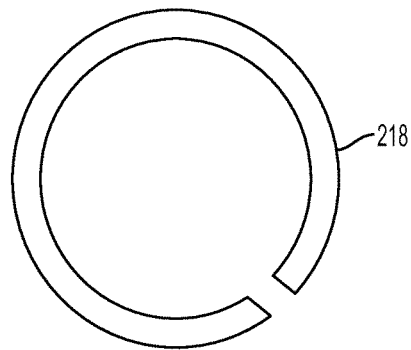
FIG. 4C is a top plan view of a valve ring for use with the intake and exhaust valve disks in accordance with the present invention.

As noted, the rotary ring valve system of the present invention is configured for use with a rotary engine, such as in general engine 40 shown above, and comprises an alternative valve plate assembly and bearing plate, with the valve plate assembly in turn comprising a valve plate supporting rotary ring valves. One embodiment of such a rotary ring valve system is disclosed in FIGS. 4A-7B and is schematically illustrated in connection with a rotary engine 40a in FIG. 8. As shown an intake ring valve disk or rotary ring valve disk 200 and an exhaust ring valve disk or rotary ring valve disk 202 are configured for installation in a valve plate 204 as a valve plate assembly 206 (FIG. 8), with valve disks 200, 202 configured to rotate in valve plate 204 to operate as rotary valves. In turn the valve plate assembly 206 is mounted to the rotor housing 76a between the associated bearing plate 208 to selectively allow intake and exhaust of engine 40a. As understood from FIG. 8, in contrast to rotary engine 40 disclosed above, rotary engine 40a of FIG. 8 includes a valve plate assembly 206 on just one side of engine 40a with plate 204 and plate assembly 206 comprising a combined intake and exhaust valve plate 204 and valve plate assembly 206. As discussed in more detail below, intake rotary valve 200 and exhaust rotary valve 202 employ a snap-in ring 218 (FIG. 4C) mounted to the outer radial edge of valves 200, 202 to inhibit unwanted leakage and blow-by of the air-fuel mixture during compression and ignition.

Figure 4A:
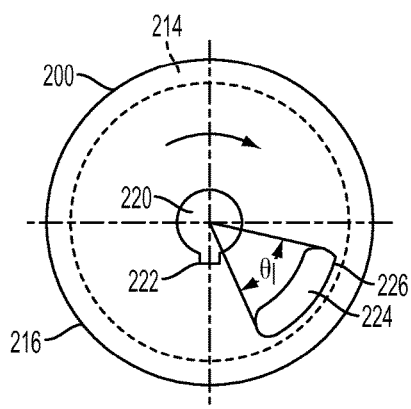
FIG. 4A is a top plan view of an intake ring valve disk in accordance with the present invention.
Figure 4B:
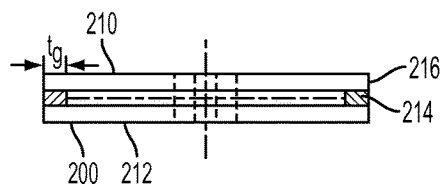
FIG. 4B is a side view of the ring valve disk of FIG. 4A.

FIGS. 4A and 4B disclose intake rotary ring valve 200 to comprise a circular member having a first side 210 and a second side 212 with a perimeter or circumferential groove 214 formed in the radial outward edge or wall 216. Groove 214 is configured to receive a snap-in ring 218 (FIG. 4C), where ring 218 is constructed of a metallic material as a split ring. When installed onto ring valve 200, the outer radial edge of ring 218 extends radially outward beyond radial wall 216 of ring valve 200. As described in more detail below, ring 218 functions to seal valve 200 relative to valve plate 204 to inhibit leakage and blow-by of the air-fuel mixture during compression and ignition. Rotary intake valve 200 further includes a central aperture 220 for mounting to a rotor shaft 54a, with a keyway 222 formed in valve 200 for joining to shaft 54a by a key mount.

Still further, rotary intake valve 200 also includes an intake port or cutout 224 that forms an opening extending from first side 210 to second side 212 and through which intake air is delivered into the combustion chamber of engine 40a. In the illustrated embodiment intake port 224 is configured as an arcuate opening having a predefined arcuate length, with the outer edge 226 is set radially inward relative to the depth of groove 214 in edge wall 216. As discussed in more detail below, as rotary intake valve 200 rotates in valve plate 204, intake port 224 is rotated past ports or passages to allow intake air to enter combustion chamber of engine 40a.

Figure 5A:
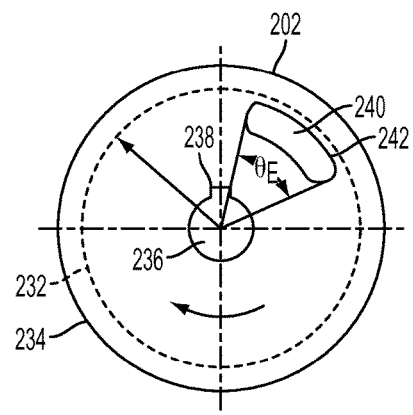
FIG. 5A is a top plan view of an exhaust ring valve disk in accordance with the present invention.
Figure 5B:
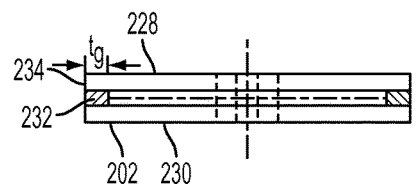
FIG. 5B is a side view of the ring valve disk of FIG. 5A.

FIGS. 5A and 5B disclose exhaust rotary ring valve 202, which is of substantially similar construction to rotary intake ring valve 200 discussed above. It thus includes a first side 228, a second side 230, and a groove 232 formed in radial edge 234, with groove 232 configured to receive a piston ring 218. Rotary ring valve 202 further includes an aperture 236 and keyway 238 for mounting valve 202 to a rotor shaft 54b (FIG. 8), with valve 202 being mounted for rotation within or to valve plate 204. An exhaust port 240 is included, which in the embodiment shown comprises an arcuate aperture extending from side 228 to side 230 of valve 202, with an outer edge 242 of port 240 being located radially inward of the groove 232.

Figure 6A:
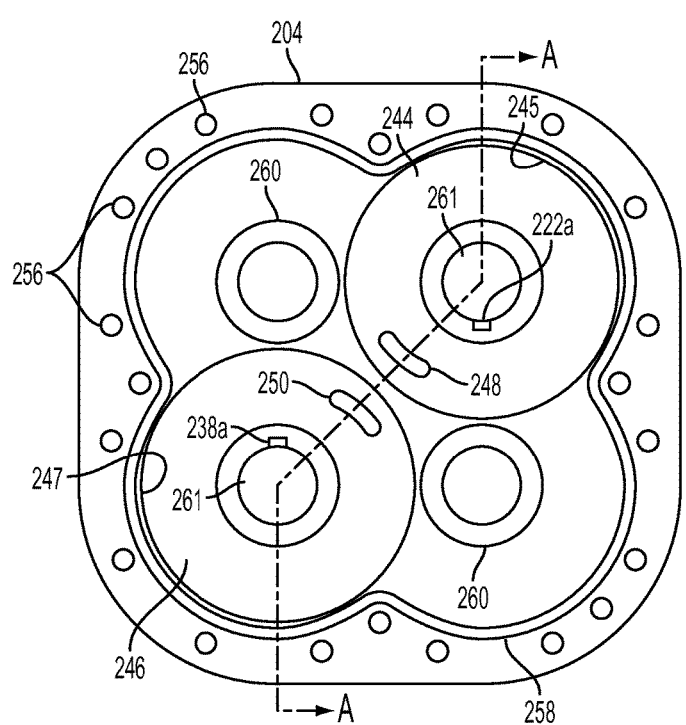
FIG. 6A is a top plan view of an intake/exhaust valve plate in accordance with the present invention for a rotary engine with keyway location positions shown for reference purposes only.
Figure 6B:
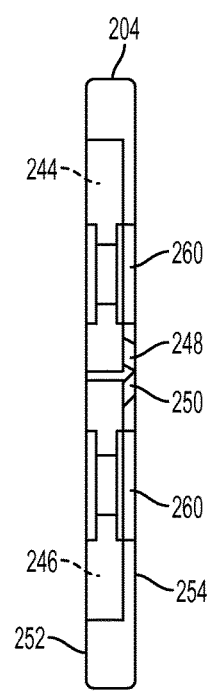
FIG. 6B is a side sectional view of the valve plate of FIG. 6A along the line A-A in FIG. 6A.

The illustrated embodiment of valve plate 204 is shown in FIGS. 6A and 6B, where the view of FIG. 6A discloses the valve plate 204 as viewed looking from outside of the engine inwardly towards the rotors. Valve plate 204 includes an intake bore 244 for receiving intake valve disk 200 and an exhaust bore 246 for receiving exhaust valve disk 202, where the intake bore 244 and exhaust bore 246 are formed as wells or counter-bores in plate 204 having cylindrical sidewalls. Intake bore 244 includes an intake port opening 248 and exhaust bore 246 includes an exhaust port opening 250, where the openings 248 and 250 are formed as arcuate openings. It should be appreciated, however, that alternatively shaped intake and/or exhaust port openings may be employed, which in combination with the ports 224 and 240 of the intake valve disk 200 and exhaust valve disk 202 determine the actual opening and closing of the valves. Valve plate 204 includes an outer side 252 and an inner side 254, where when assembled inner side 254 is mounted adjacent rotors 44a of engine 40a. As understood from FIGS. 6B and 8, openings 248 and 250 are angularly oriented to angle inwards toward the center of the plate from outer side 252 toward inner side 254 to allow intake/exhaust near minimum volume of the combustion chamber.

Valve plate 204 further includes multiple holes 256 for affixing with housing 76a, and optionally may employ a seal member 258 disposed outwardly from intake bore 244 and exhaust bore 246, such as an o-ring or a flexible gasket material. FIGS. 6A and 6B further disclose bushing assemblies 260 located at shaft through holes 261 for rotationally supporting rotor shafts 54a and 54b, as well as for supporting the additional rotor shafts of engine 40a to which intake or exhaust rotary valve disks are not mounted. For illustrative purposes only, FIG. 6A discloses keyway location positions 222a and 238a for the intake valve disk 200 and exhaust valve disk 202, respectively. These are intended to depict the relative mounting orientations of intake valve disk 200 and exhaust valve disk 202 of FIGS. 4A and 5A into valve plate 204, as discussed in more detail below, and it should be understood are not constructed in valve plate 200 or bushing assemblies 260. It should be understood that each valve disk 200, 202 when mounted to valve plate 204 forms a rotary ring valve.

Referring now to FIGS. 7A and 7B, bearing plate 208 is shown to include an intake port or passage 262 and an exhaust port or passage 264, which in the illustrated embodiment are both shown as arcuate openings. When bearing plate 208 is mounted with valve plate 200, intake port 262 is aligned with intake port opening 248 and exhaust port 264 is aligned with exhaust port opening 250, with the respective rotary intake valve 200 and exhaust valve 202 positioned there between for selectively allowing intake and exhaust to pass there through. Bearing plate 208 includes an outer side 266 and an inner side 268, with inner side 268 mated with outer side 252 of valve plate 204 when assembled together. An optional seal member 270 may be provided on outer side 266, such as a gasket or o-ring. Bearing plate 208 further includes rotor shaft through holes 271 and bearing bores 272 for rotationally supporting bearings and rotor shafts, such as shafts 54a and 54b. Multiple fastener holes 273 are additionally included for mounting an intake manifold 274 and an exhaust manifold 275 (FIG. 8) to engine 40a.

Figure 8:
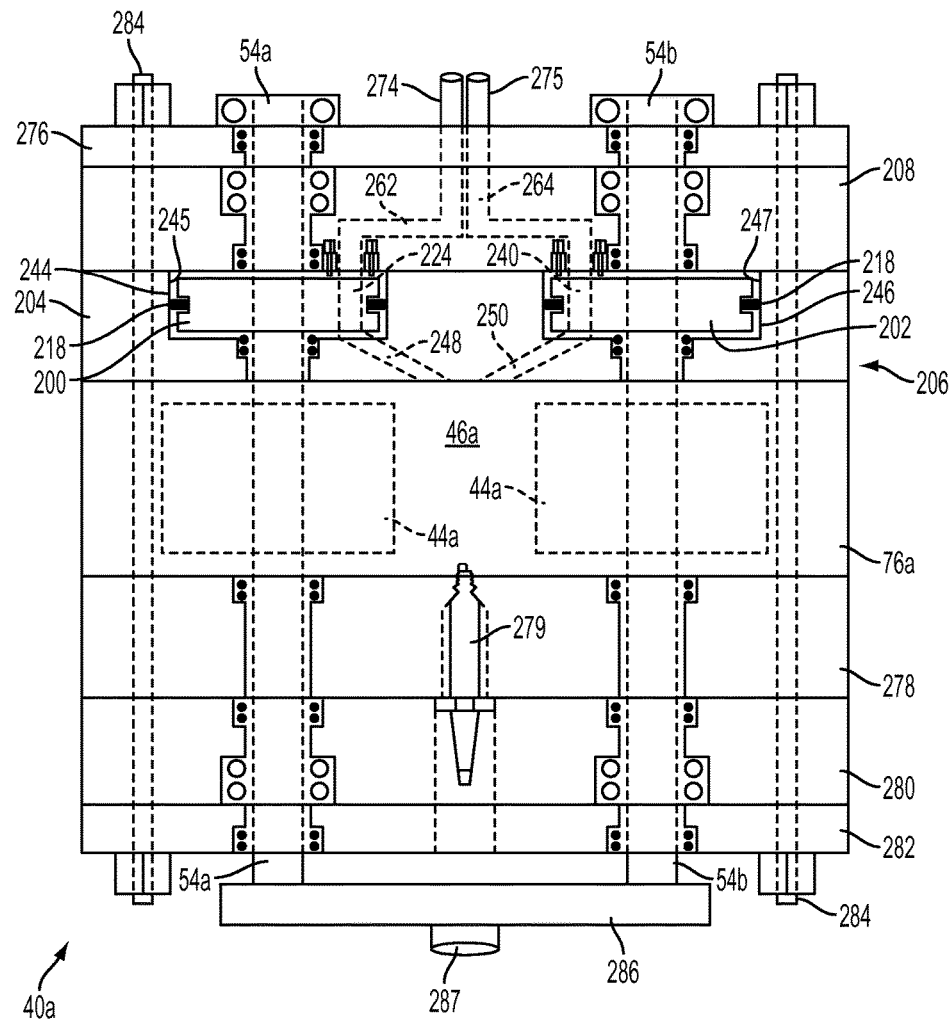
FIG. 8 is a schematic illustration of an embodiment of a rotary engine constructed with a rotary valve system in accordance with an aspect of the present invention and illustrating the stack-up of the various plate members.

FIG. 8 schematically illustrates the complete stack-up for a basic rotary ring valve equipped rotary engine 40a. A rotor 44a is mounted to each of intake rotor shaft 54a and exhaust rotor shaft 54b, where the shafts 54a, 54b are diametrically opposed shafts of engine 40a. As shown, valve plate assembly 206 is mounted to one side of engine 40a, with a cover or end plate 276 mounted over bearing plate 208, to which are mounted intake manifold 274 and exhaust manifold 275. The opposite side of engine 40a includes a plug plate 278 to which is mounted a spark or glow plug 279 that extends into the combustion chamber 46a formed in housing 76a. A plug bearing plate 280 and an additional end or cover plate 282 are also provided, with the entire stack-up being secured together by way of multiple fasteners 284 (two shown in FIG. 8). As shown, plug bearing plate 280 and cover plate 282 include an opening for installation of plug 279, and may be used to secure the plug 279 with a hold-down collar or nut. FIG. 8 further discloses multiple bearings/journals supporting rotation of shafts 54a, 54b in the stack-up of the valve plate assembly 206, bearing plates 208 and 280, spark plug plate 278, and end plates 276, 282. It should be appreciated that the rotor shafts for the additional rotors (not shown) will similarly be supported, with the rotor shafts connecting to a gearing or drive assembly 286 to transmit power via an output shaft 287. It should be further appreciated that alternative rotor shaft bushings and bearing positions relative to that shown in FIG. 8 may be employed.

FIG. 8 illustrates the intake passage through engine 40a from the intake manifold 274 through the intake port 262 in bearing plate 208, through intake port 224 in rotary intake valve 200 and through intake bore 244 in valve plate 204. Similarly, the exhaust passage is shown from exhaust manifold 275 through the exhaust port 264 in bearing plate 208, through exhaust port 240 in rotary exhaust valve 202 and through exhaust bore 246 in valve plate 204.

In the embodiment of the rotary ring valve system of rotary engine 40a of FIGS. 4A-8, there is a single intake valve 200 and a single exhaust valve 202 mounted on diametrically opposite rotor shafts 54a, 54b on the same side of the rotors 44a with each valve consisting of just a single ring disk. This side is called the valving side. The valves 200, 202 are contained in wells 244, 246, respectively, machined on a single ring valve plate 204 located on the valving side of the rotors 44a. In the illustrated embodiment the intake and exhaust ports 248, 250 on the valve plate 204 and intake and exhaust manifold ports 262, 264 on the bearing plate 208, respectively, were the same shape and size as their respective intake port 224 and exhaust port 240 on the rotary valves 200, 202. However, alternative sized and shaped ports/openings may be employed within the scope of the present invention.

As also understood from FIG. 8, rings 218 disposed within valve disks 200, 202 contact the cylindrical sidewalls 245, 247 of counter-bores 244, 246, respectively, As noted, the keyway position locations 222a, 238a in FIG. 6A are not present on the valve plate 204 of FIG. 6A, but are included for reference purposes only to indicate the relative position of the intake and exhaust valve disks 200, 202, respectively, at a given reference instant in time in the following discussion. From examining the disks 200, 202 in FIGS. 4A and 5A the time instant depicted is when the exhaust port 240 of exhaust rotary valve 240 is fully aligned with the exhaust port 250 in the valve plate 204. After the rotor shafts rotate 90 degrees more in the direction shown the intake port 224 of the intake valve 200 will be fully aligned with the intake port 248 in the valve plate 204.

Assuming annular cutout ports on each disk with the intake port 224 corresponding to $\Theta I$ (intake) degrees and the exhaust port 240 corresponding to $\Theta E$ (exhaust) degrees. Still further, by way of example only, the following discussion assumes $\Theta I=\Theta F=\Theta=45$ degrees. With the shaft keyways oriented as shown in FIGS. 4A and 5A, the exhaust rotary valve disk exhaust port 240 would be would be centered over the exhaust passage 250 machined into the bottom of the exhaust well/counter-bore 246. At this same time the intake passage 248 is fully blocked by the intake ring disk 200. Defining this orientation to occur at a reference angle of 0 degrees for the rotor shafts, with the above intake port 224, 228 and exhaust port 240, 246 size assumptions there is a 45 degree separation between the trailing edge of the exhaust port 240 cutout on the exhaust valve ring 202 and the leading edge of the intake port 224 cutout on the intake valve ring 200. Thus after a 45 degree rotation of the rotors the exhaust port 250 of the valve plate 204 will become fully blocked and the intake port 248 of the valve plate 204 will just start to become unblocked. The exhaust port 250 will remain fully blocked for an additional 270+22.5=292.5 degrees, i.e. until a total rotation of 360-22.5=337.5 degrees has occurred from the rotor reference position. Then the exhaust port 250 will start to unblock again, becoming fully unblocked at 360 degrees rotor shaft rotation to complete one engine cycle.

At the initial condition time (rotor rotation angle=0 degrees) depicted in FIG. 6A, the intake passage 248 is fully blocked while the exhaust passage 250 is fully unblocked as noted above. After 45 degrees of total rotation the intake passage 248 will commence to become unblocked. It will become fully unblocked at a rotation angle of 90 degrees and blocked again at a total shaft rotation of 135 degrees. Thereafter the intake passage 248 will remain fully blocked for another 270 degrees of shaft rotation, i.e. until the total shaft rotation equals 135+270=405 degrees at which time intake passage 248 will start to open again as 405 degrees=45 modulo 360. The inner chamber is completely closed off during the compression and power strokes of the engine 40a.

Note that with 45 degree or less angular cutouts for the intake port 224 and exhaust port 240 in the valve disks 200, 202, respectively, and in the absence of any phasing of the intake and exhaust valve disks 200, 202 there is no inherent overlap between intake and exhaust. An inherent non-zero overlap can be produced by increasing the cutouts angular extent to greater than 45 degrees. The overlap increases to 90 degrees of overlap when the intake and exhaust cutouts are 90 degrees in extent. In general the amount of inherent overlap between intake and exhaust is given by 2*(Θ−45) where Θ is expressed in degrees. This assumes identical sized cutouts for the intake port 224 and exhaust port 240, of course. Similarly for Θ<45 degrees the overlap is negative meaning there is a "dead" shaft rotation interval between exhaust and intake where the inner chamber is completely closed.

A small overlap may be desired between exhaust and intake but none between the end of intake and the start of compression. As such, the exhaust port 240 cutout could be formed somewhat greater than 45 degrees, such as approximately 60 degrees, for example, but then introducing sufficient phasing that intake is again closed off before compression starts. In the initial embodiment the phasing could be changed by dynamically altering the rotor keyway orientations at the reference time epoch from that shown in the preceding figures. This dynamic altering of the rotor keyway orientations between exhaust and intake valve disks was referred to as variable valving in U.S. Pat. No. 8,356,585.

A change in intake and/or exhaust timing/overlap only requires that the associated valve disk be angularly advanced or retarded a small amount with respect to the spinning shaft to produce the desired lead or lag in the intake or exhaust timing. For example at high RPM it may be desirable to have exhaust retarded slightly and intake advanced slightly so that exhaust and intake overlap. This overlap can be established even in the basic configuration using single valve disks for intake and for exhaust.

As noted, both intake and exhaust are accomplished on the same side of the rotors 44a in the illustrated embodiment rather than on separate sides of the rotors 440. As such, a spark plug or glow plug 279 may readily be placed on the opposite side of housing 76a from valve plate assembly 206 over the central chamber for optimal spark or self-ignition. The plug 279 may be screwed into the plug mounting plate 278 adjacent to the rotors 44a on the opposite side from the valve plate 204. The plug mounting side of the engine will be called the sparking side for the discussion herein.

Figure 9:
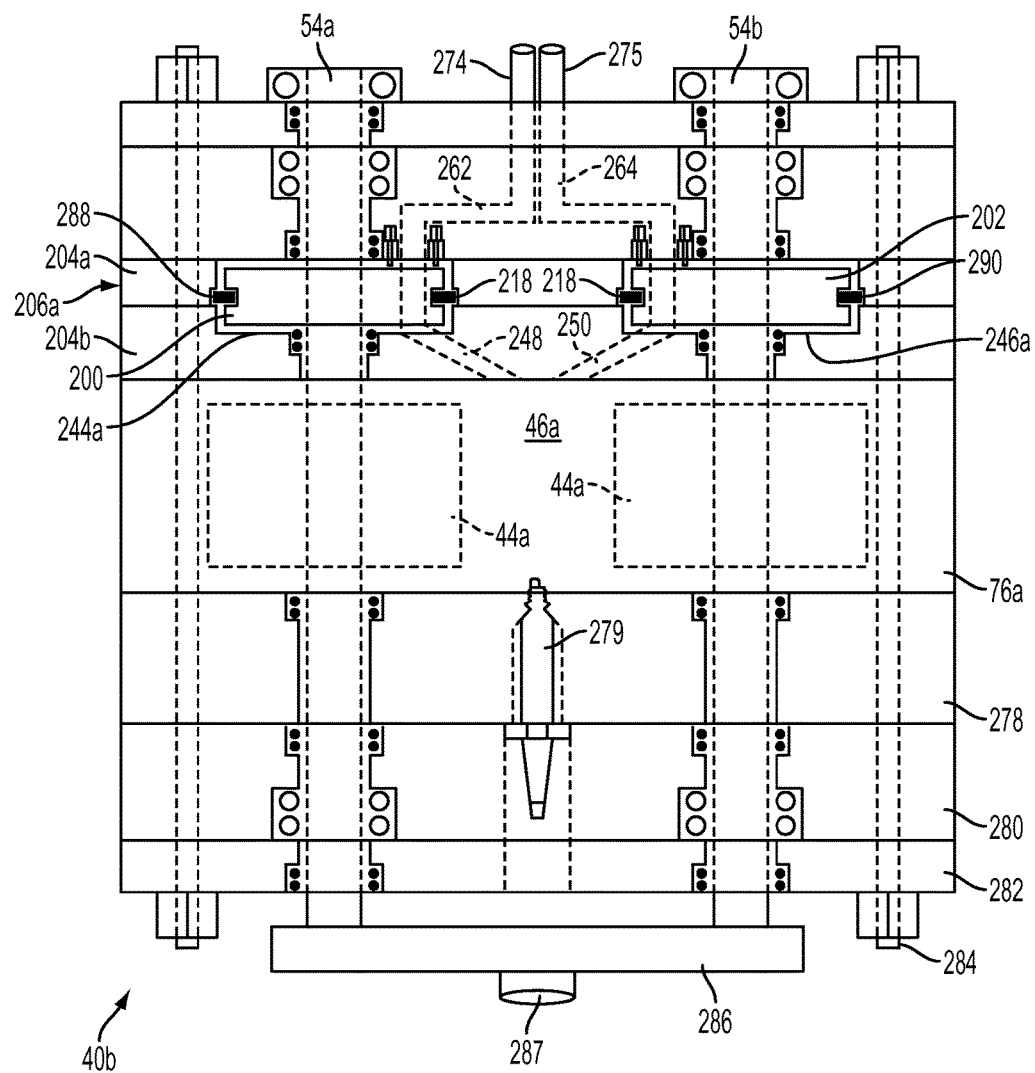
FIG. 9 is a schematic illustration of an embodiment of a rotary engine constructed with a rotary valve system in accordance with another aspect of the present invention and illustrating the stack-up of the various plate members.
Figure 10A:
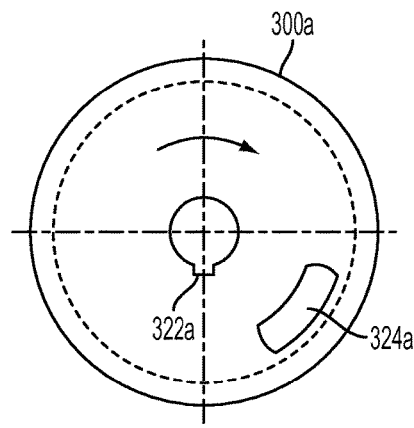
FIGS. 10A-10H disclose top plan views and associated side views of two intake ring valve disks and two exhaust ring valve disks in accordance with the present invention as used together in an alternative embodiment.
Figure 10C:
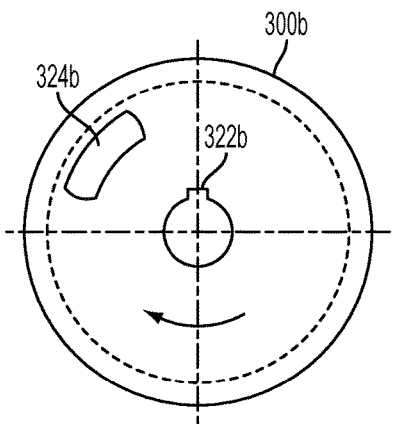
Figure 10B:
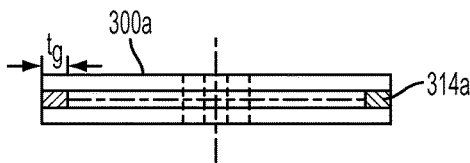
Figure 10D:
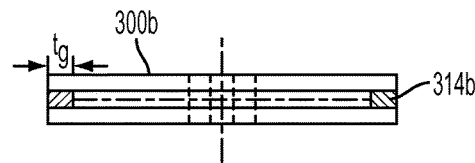
Figure 10E:
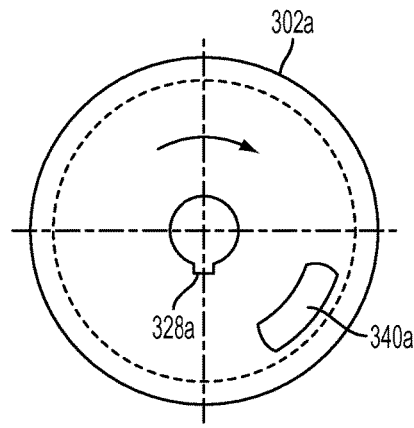
Figure 10G:
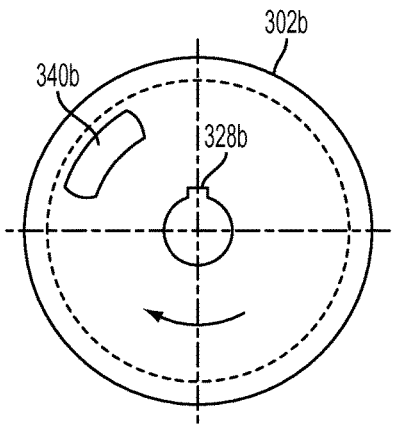
Figure 10F:
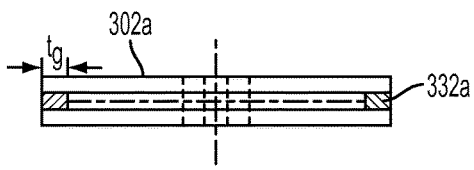
Figure 10H:
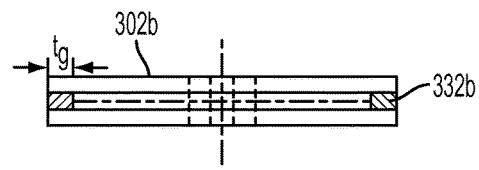

FIG. 9 discloses a rotary engine 40b that is substantially similar to that shown in FIG. 8, but includes an alternative valve plate assembly 206a. In particular, an alternative valve plate is employed comprising a valve plate assembly formed by a first valve plate 204a and a second valve plate 204b. As shown, a shallow circular or circumferential channel or groove 288 is provided in the sidewall at counter bore 244a for intake valve 200 and a corresponding circular or circumferential channel or groove 290 is provided in the sidewall at counter bore 246a for exhaust valve 202, with the outer edges of the rings 218 on valve disks 200, 202 then riding in grooves 288, 290. This serves to inhibit any possible axial translations/distortions of the rings 218 and/or the valve disks 200, 202 which could result in unwanted friction with the corresponding rotor shaft bushings and spacers in the engine 40b. As noted, the ring valve plate is split into two sub-plates 204a, 204b to allow for easy replacement or inspection of the rings 218 and valve disks 200, 202. The use of grooves 288, 290 in the sidewalls of the counter-bores 244a, 246a to inhibit the rings 218 from translating and distorting the valve disks 200, 202 is one method of preventing/reducing valve friction. Other techniques, including continuous lubrication of the valves and/or ribbing of the flat surfaces on the valve disks 200, 202 may be employed to inhibit or reduce unwanted valve friction.

Figure 14:
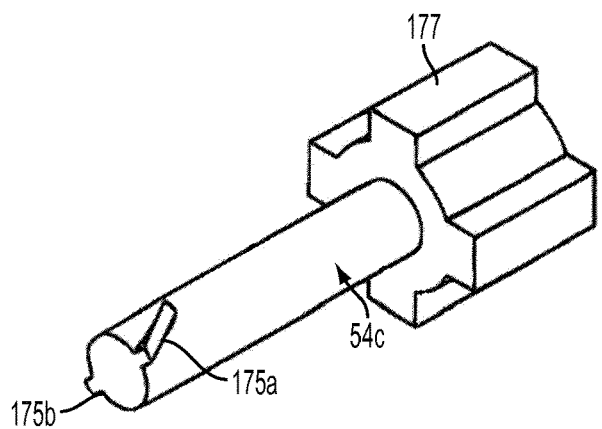
FIG. 14 is a perspective view of a rotor shaft for use in providing variable valve timing and index phasing in accordance with an aspect of the present invention.

FIGS. 8 and 9 disclose use of a single intake rotary ring valve disk 200 and a single exhaust rotary ring valve disk 202. Of note is that variable valve timing may be accomplished using such a single disk arrangement. For example, rotor shafts 54a, 54b may be provided with helical keys, with the corresponding keyways 222, 238 of rotary ring valves 200, 202, respectively, being formed as helical keyways, as disclosed in U.S. Pat. No. 8,356,585. With each rotary ring valve 200, 202 mounted on a separate shaft, the helical key and groove can be applied to change the relative timing between the two valve disks 200, 202. Shaft 54c shown in FIG. 14, for example, discloses a rotor shaft for variable valve timing that includes a set of two helical keys or protrusions 175a, 175b, with a rotor alignment spline 177 also provided on rotor shaft 54c. Alternative valve disks 200, 202 may be provided with helical keyway grooves for use with separate shafts constructed in accordance with shaft 54c with the helical keys 175a, 175b engaging with the helical grooves on the alternative valve disks. Axial translational movement of rotor shaft 54c relative to the valve disks, which are constrained within the counter-bores 244, 246 of valve plate 204 by bearing plate 208, thus imparts relative rotational movement of the valve disks relative to or on rotor shaft 54c. In this manner, variable valve timing can be achieved by altering the valve opening time, such as based on engine RPM and/or engine load. Alternative mechanisms for accomplishing axial movement or translation of rotor shaft 54c may be provided, such as, for example, pushrods, electromechanical means, axial springs and the like. Still further, a coaxial sleeve may be placed over a rotor shaft with just the sleeve moving fore-aft, and not the entire rotor shaft, in order to obtain relative rotational movement of a valve disk to the shaft. In such an embodiment, the helical keys or bosses or protrusions may be located on the inside of the sleeve and the helical grooves are again on the shaft hole/keyway of each arcuate disk. This approach may reduce the mechanical load on the actuator mechanism or system used to produce the axial translations.

Thus engines 40a and 40b feature a single rotary intake valve and a single rotary exhaust valve each using a single ring disk residing on two diametrically opposite rotor shafts on one side of the rotors.

Two alternative embodiments for variable valve indexing—i.e. changing the effective port size/duration—are discussed below. A first alternative embodiment of a rotary ring valve system is disclosed in connection with FIGS. 10A-12B that implements variable indexing and employs utilizing more than one valve ring disk for the intake and exhaust operations. In this embodiment, as discussed in more detail below, full featured variable valving is obtained by putting the two disks of a given valve operation on separate, diametrically opposed rotor shafts, where the valve operations comprise intake and exhaust. Thus, two valve ring disks each mounted on separate rotors are utilized for intake and, correspondingly, two other valve ring disks each mounted on separate rotors are utilized for exhaust. A given ring valve can be considered a "split-valve" with its two disks residing on adjacent or diagonally opposite rotor shafts. Thus full-featured rotary engine operation will require four valve disks, but with all four valve disks fitting in a single valve plate on one side of the rotor housing.

With valve indexing active the semicircular cutouts of a given pair of cooperating valve disks may be adjusted to overlap their associated port openings in varying amounts as a function of RPM, throttle and other parameters. To vary the effective port size or opening duration the angular orientations of the two disks for a given split-valve can be differentially adjusted relative to their rotor shafts, one disk receiving an angular advance with respect to its driving shaft and the other an angular retardation to produce up to twice the effective port size or twice the angular duration possible from a single disk valve.

FIGS. 10A-10H illustrate four valve disks used for achieving variable valve indexing, which include a first intake ring valve disk 300a, a second intake ring valve disk 300b, a first exhaust ring valve disk 302a, and a second exhaust ring valve disk 302b. Valve disks 300a, 300b, 302a, 302b are of substantially similar construction to valve disks 200, 202 discussed above such that the specifics of the valve disks will not all be discussed in detail. As shown, each valve disk includes a groove 314a, 314b, 332a, 332b, respectively, for receiving a snap ring 218. Intake valve disks 300a, 300b each include an arcuate intake port or cutout 324a, 324b, and exhaust valve disks 302a, 302b each include an arcuate exhaust port or cutout 340a, 340b. Still further, each disk includes a keyway 322a, 322b, 328a, 328b for mounting to a respective rotor shaft.

Figure 11A:
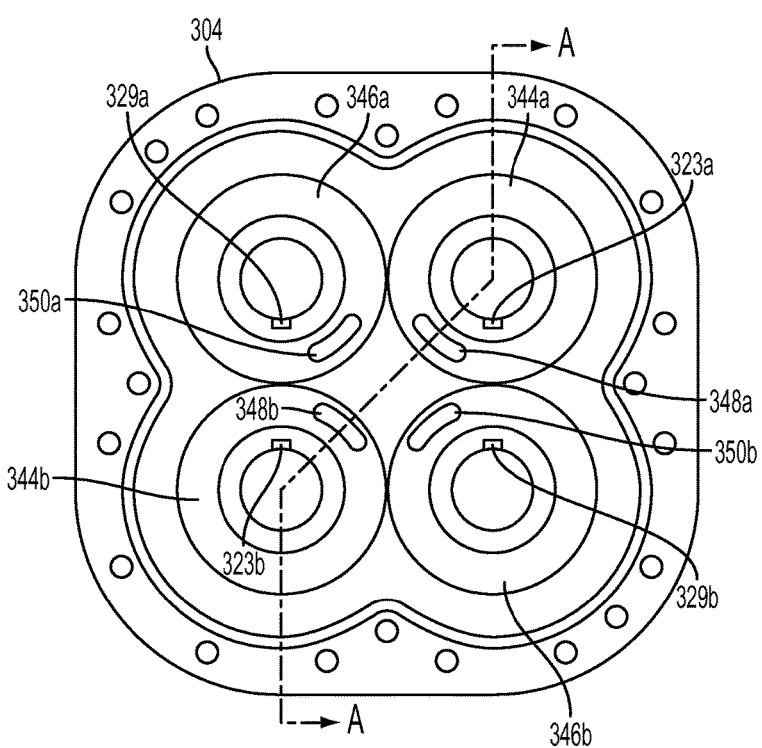
FIG. 11A is a top plan view of an alternative intake/exhaust valve plate in accordance with the present invention for a rotary engine employing the four ring valve disks of FIGS. 10A-10H with keyway location positions shown for reference purposes only.
Figure 11B:
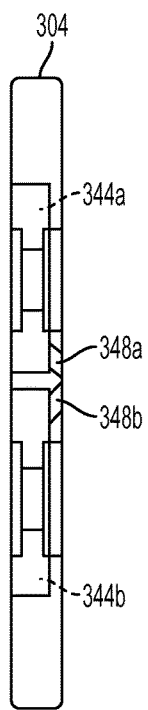
FIG. 11B is a side sectional view of the valve plate of FIG. 11A along the line A-A in FIG. 11A.

The noted valve disks of FIGS. 10A-10H are configured for rotational mounting to valve plate 304 shown in FIGS. 12A and 12B, where valve plate 304 is of substantially similar construction to valve plate 204 such that not all of the specifics of valve plate 304 will be discussed herein. As shown, valve plate 304 includes a first intake valve disk counter-bore or well 344a for receiving first intake valve disk 300a, a second intake valve disk counter-bore or well 344b for receiving second intake valve disk 300b, a first exhaust valve disk counter-bore or well 346a for receiving first exhaust valve disk 302a, and a second exhaust valve disk counter-bore or well 346b for receiving second exhaust valve disk 302b. Associated with separate ones of the valve disk counter-bores are a first intake port opening 348a, a second intake port opening 348b, a first exhaust port opening 350a, and a second exhaust port opening 350b. As with valve plate 204, these ports angle inward toward the center of the combustion chamber, as understood from FIG. 11B. FIG. 11A further shows for illustrative purposes only relative orientations of the valve disk keyways of valve disks 300a, 300b, 302a, 302b at an initial instance when installed on valve plate 304, with the locational positions being shown at 323a, 323b, 329a, 329b for reference purposes only. It should be appreciated that these do not represent actual keyways in the valve plate 304 or the associated bushings.

FIGS. 12A and 12B illustrate the bearing plate 308 for use with the valve plate 304 and disks of FIGS. 10A-10H, with bearing plate 308 being of substantially similar construction to bearing plate 208 such that not all of the specifics of bearing plate 308 will be discussed herein. Bearing plate 308 is shown to include a first intake passage port 262a, a second intake passage port 262b, a first exhaust passage port 264a, and a second exhaust passage port 264b. Bearing plate 308 further includes shaft through holes 371, bearing bores 372 and a plurality of fastener holes 373 for the mounting of intake and exhaust manifolds. With two intake manifolds or two exhaust manifolds it is further possible to modulate the flow of the fresh or spent charges by closing off or restricting one of the manifolds when not needed. The stack-up of a rotary engine employing the rotary ring valving system of FIGS. 10A-11B is substantially similar to that shown in FIGS. 8 and 9 such that an additional stack-up drawing is not disclosed, where valve plate 304 and bearing plate 308 would be used in place of valve plate assembly 206 or 206a and bearing plate 208.

FIGS. 10A-10H illustrate an initial orientation for mounting of valve disks 300a, 300b, 302a and 302b to valve plate 304, which may be referred to as a normal or default operating point. In the illustrated embodiment of FIGS. 10A-12A, the arcuate length of (1) the intake/exhaust ports 324a, 324b, 340a, 340b of the valve ring disks, (2) the intake/exhaust port openings 348a, 348b, 350a, 350b of the valve plate 304, and (3) the intake/exhaust passage ports 262a, 262b, 264a, 264b are all assumed again to equal each other and are approximately 45 degrees as shown. It should be appreciated, however, that the various openings, ports, or passages may be larger or smaller, or may not be equal to each other.

Under the 45 degree cutout size assumption and under normal operation with variable valving not energized the exhaust valve disks 302a, 302b have simultaneously fully opened up the two exhaust ports 350a, 350b of the valve plate 304 at the instantaneous rotor shaft positions indicated in FIG. 11A. After 45 degrees shaft rotation the two exhaust ports 350a, 350b and their passage ways in the valve plate 304 are fully blocked and the two intake ports 348a, 348b in valve plate 304 are just starting to become uncovered. At 90 degrees of shaft rotation relative to the initial orientation shown in FIG. 11A the two intake ports 348a, 348b in valve plate 304 are fully unblocked and maximum intake charge transfer takes place. At 135 degrees of shaft rotation intake is concluded and compression of the charge begins lasting to 135+90=225 degrees of shaft rotation. Subsequently ignition is introduced via a spark or self-ignition and the power stroke lasts for another 90 degrees of shaft rotation, i.e. until a total rotation of 225+90=315 degrees from that shown by the keyway positions 323a, 323b, 329a, 329b included in FIG. 11A. Thereafter the exhaust ports 350a, 350b in valve plate 304 begin to open and are fully uncovered at a total shaft rotation of 360 degrees completing the cycle. In the absence of variable valving, this operation thus corresponds to that of the basic rotary ring valve system described above in connection with FIGS. 4A-8.

Variable valve timing may be employed with the rotary ring valve system of valve ring disks 300a, 300b, 302a and 302b, such as via use of rotors 54c (FIG. 14), or other mechanisms, such as those noted above. With the variable valve timing (phasing) feature in operation, retarding the angular orientations of both of the exhaust valve disks 302a, 302b (exhaust comes later) relative to the shaft and/or advancing the angular orientations of both of the intake valve disks 300a, 300b (intake comes earlier) increases overlap in the phasing between intake and exhaust. An overlap between exhaust and intake is created or an existing overlap is increased. Any undesired overlap present between the power stroke and the start of exhaust is reduced as is any undesired overlap between intake and compression.

Conversely, advancing the angular orientations of both of the exhaust valve disks 302a, 302b relative to their shafts (exhaust comes earlier) and/or retarding the angular orientations of both of the intake valve disks 300a, 300b with respect to their shafts (intake comes later) produces an increased phasing delay between exhaust and intake timing. Any previous overlap, if present, between exhaust and intake would thereby be reduced. However advancing the exhaust timing too much means exhaust may overlap the end of the power stroke and/or delaying the intake timing means intake may overlap the start of compression. These are undesired timings unless some valve indexing is simultaneously applied to counteract the unwanted overlaps.

As previously noted the same phasing operations as above can be achieved with only a single ring valve disk per intake/exhaust valve. However, with two ring valve disks for each of the exhaust and intake operations, indexing is also possible between the two exhaust ring valve disks 302a, 302b or between the two intake ring valve disks 300a, 300b relative to the orientation as understood in FIG. 11A. This will allow compensation for any unwanted overlaps with the power stroke or compression stroke that might arise with phasing only as cited in the above paragraph.

With the approximately 45 degree arcuate cutouts shown in FIGS. 10A-11A, the total duration of intake or exhaust can be varied from 90 to 180 degrees of shaft rotation if indexing is present. Alternatively and more customary with indexing enabled, the arcuate or semicircular intake and exhaust ports 324a, 324b, 340a, 340b of the valve disks 300a, 300b, 302a, 302b, respectively, could be made to extend over smaller arcs than the approximately 45 degrees shown in FIGS. 10A-10H. For example, if the intake and exhaust ports on the valve disks covered only 30 degrees of the valve disk periphery, then the effective intake or exhaust annular cutout arc length can be varied from 30 to 60 degrees via indexing alone. This will produce an overlap between exhaust and intake starting at the 45 degree effective cutout size and increasing to 30 degrees of overlap at an effective cutout size of 60 degrees. However gaps would begin to occur between exhaust and intake for effective annular arc lengths below 45 degrees assuming only pure indexing is performed for both intake and exhaust. Thus at the minimum of 30 degrees of effective cutout length (cutouts synchronous for a given intake or exhaust disk pair) and no compensating phasing between intake and exhaust the gap would correspond to 30 degrees of shaft rotation as can be readily computed (where negative overlap angles mean gaps between exhaust and intake). Some phasing between the intake and exhaust valves would thus be required to eliminate this gap.

Figure 13:
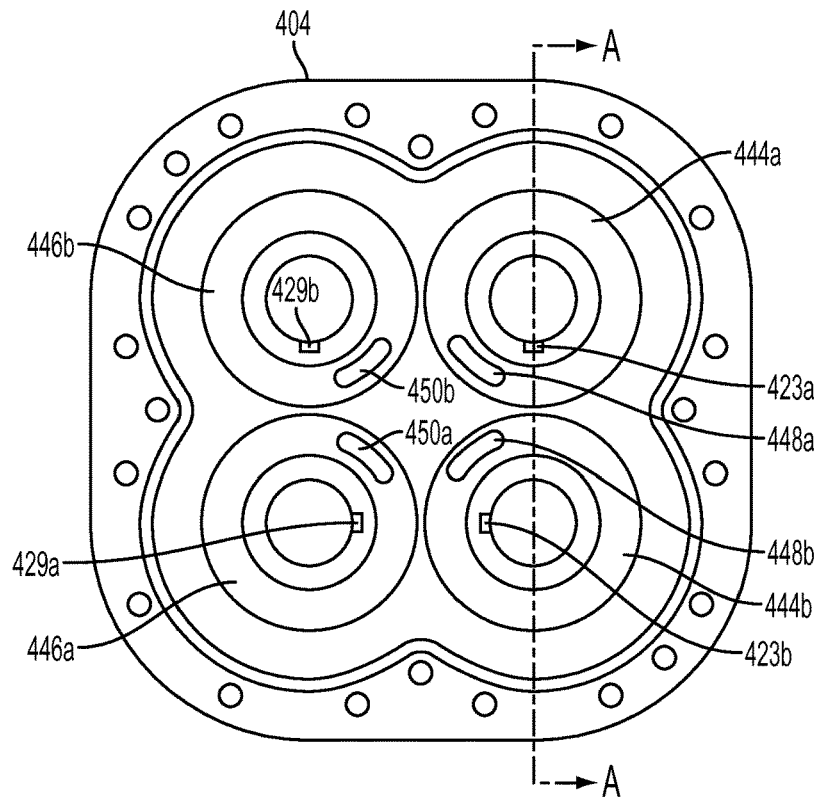
FIG. 13 is a top plan view of another alternative intake/exhaust valve plate in accordance with the present invention for a rotary engine employing the four ring valve disks of FIGS. 10A-10H.

A second alternative embodiment for variable valve indexing in accordance with the present invention is disclosed in connection with the valve plate 404 of FIG. 13. This embodiment employs the four valve ring disks previously disclosed, those being valve disks 300a, 300b, 302a and 302b of FIGS. 10A-10H, but used in connection with the valve plate 404 orientation of FIGS. 13A-13B. In this embodiment the two intake valve disks 300a, 300b are placed adjacent to each other in the valve plate 404 rather than diagonally opposite each other. Similarly the two exhaust valve disks 302a, 302b are also placed adjacent to each other in the valve plate 404.

As understood from FIG. 13, the valve disks of FIGS. 10A-10H are configured for rotational mounting to valve plate 404 shown in FIG. 13, where valve plate 404 is of substantially similar construction to valve plate 304 such that not all of the specifics of valve plate 404 will be discussed herein. As shown, valve plate 404 includes a first intake valve disk counter-bore or well 444a for receiving first intake valve disk 300a, a second intake valve disk counter-bore or well 444b for receiving second intake valve disk 300b, a first exhaust valve disk counter-bore or well 446a for receiving first exhaust valve disk 302a, and a second exhaust valve disk counter-bore or well 446b for receiving second exhaust valve disk 302b. Associated with separate ones of the valve disk counter-bores are a first intake port opening 448a, a second intake port opening 448b, a first exhaust port opening 450a, and a second exhaust port opening 450b. As with valve plate 304, these ports angle inward toward the center of the combustion chamber. FIG. 13 further shows for illustrative purposes only relative orientations of the valve disk keyways of valve disks 300a, 300b, 302a, 302b at an initial instance when installed on valve plate 404, with the locational positions being shown at 423a, 423b, 429a, 429b. It should be appreciated that these do not represent actual keyways in the valve plate 404 or the associated bushings.

Bearing plate 308 may be employed with valve plate 404, with the mounting orientation of valve disks 300a, 300b, 302a, 302b to valve plate 404 reducing the spacing between the split manifolds of a given pair of valve disks or may even allow a single manifold to be used for intake and a single manifold for exhaust. Indexing the two disks of a given associate pair and/or phasing between the exhaust and intake valves for variable valving operation is the same as in corresponding FIGS. 10A-12B. All combinations of phasing and indexing are possible in this alternative full-featured embodiment.

In general, it should be appreciated that different arc lengths for the intake valve ring disk cutouts may be used than for the exhaust valve ring disk cutouts for further versatility such as to avoid having intake overlap the compression stroke or exhaust overlap the power stroke. In addition the annular cutouts on the ring valve disks can be tapered in width as a function of circumferential angle so that the effective port apertures are further varied over the intake or exhaust time period. Also the cutouts can be machined on the valve disks in different shapes than semicircular annular or arcuate apertures as shown.

It should also be appreciated that various mechanisms may be employed for starting the engine from an external motor, properly synchronizing the rotors, and for taking power from the engine when running. This may include, for example, a chain drive, or a gear drive system, or the like. One example would be a gear system consisting of a central sun gear and four rotary planet gears, one on each rotor shaft.

The above descriptions were directed toward a four-stroke operation of a rotary engine. It should also be appreciated that two-stroke operation is also possible. In the case of the latter there are two intake and two exhaust strokes per 360 degrees of rotor shaft rotation. For basic two stoke operation (variable phasing only possible) two single ring disk valves on separate shafts for intake and two for exhaust (four altogether) could be employed. The timing of the port openings on the intake disks would be 180 degrees of shaft rotation rather than simultaneous. The same 180 degree phasing would pertain for the exhaust valves. Further the timing of the intake valves could be varied with respect to the exhaust valves but as with the previously described basic rotary engine embodiment the port size/duration would be fixed.

Still further, two valve ring disks per rotor shaft, such as disclosed in U.S. Pat. No. 8,356,585, could be employed for full featured variable valving and two stroke operation to enable variable valve indexing. There would then be two intake valves timed 180 degrees apart and two exhaust valves also timed 180 degrees apart in terms of rotor shaft rotation. Again all valving could be on one side of the rotors but would require a total of eight valve ring disks. Yet another option for two stroke operation would be to have not one but two semicircular cutouts on each disk spaced 180 degrees apart around the disk. This would again allow single ring disk per rotor shaft operation. Many other options are also possible for two stroke operation and should be apparent to those skilled in the art of rotary engine design and operation.

It should also be appreciated that features disclosed in U.S. Pat. No. 8,356,585 may also be incorporated with a rotary engine utilizing a rotary ring valve system as disclosed herein. For example, such a rotary engine may include outer chamber precompression and the use of a compression insert. Yet additional alternative mechanisms may be employed to achieve variable valve timing or phasing by way of rotating a valve ring disk on a shaft relative to the shaft can be employed relative to those disclosed above. For example, hydraulic locking and unlocking may be applied to cause a disk normally rigidly locked to a shaft to alter its angular orientation with respect to the shaft under rotation of the shaft. In such an embodiment the ring valve disk may be mounted on a coaxial sleeve slipped over the shaft such that a slight reduction of the hydraulic pressure between the coaxial sleeve and the rotating shaft would cause the sleeve to slip with respect to the shaft. Allowing only a small amount of slip before restoring full hydraulic pressure would simply retard the timing of the ring disk in the engine cycle, while allowing almost 360 degrees of angular slip before relocking would effectively amount to an advance in the ring disk timing.

The snap-in ring 218 of the rotary ring valve system of the present invention serves to seal the inner combustion chamber. The outside edge of the ring rotates in contact with the wall of the corresponding cylindrical well or counter-bore in the valve mounting plate. The disk and ring rotate together with the associated rotor shaft. The main area of valve friction is between the ring and the side wall of the counter-bore. This is because as the internal chamber pressure becomes higher and higher during compression and ignition the more the ring of a given valve disk wants to expand and the tighter it presses against the disk's counter-bore sidewall in the ring valve plate. However each ring is edge-on to the counter-bore sidewall and this minimizes the amount of rotating surfaces in contact and keeps the total friction low. Of course continuous lubrication can always be provided to the valve rings just as to the piston rings in a conventional reciprocating engine.

Another source of valve friction is between the ring disk's outboard face and the shaft bushings and annular spacers located between the valve and the associated shaft bearing plate. While the disk itself is rigidly connected to the rotor and therefore cannot translate as a whole its ring could translate under pressure along the counter-bore wall and thus distort the disk so the overall valve friction is increased. Thus, lubrication can also be applied to the flat surfaces of a given ring disk to minimize friction with its associated rotor shaft bushings and spacers. The disk faces could also be ribbed or the disk thickness suitably varied radially to minimize the contact area between the disk surfaces and bushings and spacers and further minimize friction Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A rotary apparatus, said rotary apparatus comprising:
a housing defining a housing chamber;
a plurality of elliptical rotors, each one of said plurality of elliptical rotors being mounted to a respective rotor shaft with said plurality of elliptical rotors being rotatable within said housing chamber;
at least one valve disk mounted to a respective one of said rotor shafts for rotation with said rotor shaft, said at least one valve disk having a first side and a second side with a port passing there between;
a valve plate, said valve plate including a bore for rotationally receiving said at least one valve disk therein with said bore defining a cylindrical sidewall;
said at least one valve disk including a radial edge wall with a groove disposed in said edge wall, and including a ring member disposed in said groove, said ring member contacting said sidewall of said bore when said at least one valve disk is disposed in said bore, and wherein said at least one valve disk comprises an intake valve disk and another valve disk comprises an exhaust valve disk, and said port comprises an intake port on said intake valve disk, and wherein said bore comprises an intake bore for receiving said intake valve disk, said exhaust valve disk being mounted to another said rotor shaft for rotation there with, said exhaust valve disk having a first side and a second side with an exhaust port passing there between, said valve plate including an exhaust bore for rotationally receiving said exhaust valve disk therein with said exhaust valve bore defining a cylindrical sidewall, said exhaust valve disk including a radial edge wall with a groove disposed therein, and including another ring member disposed in said groove of said exhaust valve disk with said ring member of said exhaust valve disk contacting said sidewall of said exhaust bore when said exhaust valve disk is disposed in said exhaust bore.

2. The rotary apparatus of claim 1, wherein said valve plate includes an inner side disposed toward said housing chamber and includes a passage extending from said intake bore to said inner side, wherein said intake port of said intake valve disk selectively aligns with said passage when said intake valve disk rotates within said intake bore.

3. The rotary apparatus of claim 2, wherein said valve plate is mounted to said housing.

4. The rotary apparatus of claim 2, wherein said intake valve disk is mounted to said rotor shaft for selective relative rotational movement of said intake valve disk with respect to said rotor shaft such that the rotational alignment of said intake port with said passage is adjustable by relative movement of said intake valve disk on said rotor shaft.

5. The rotary apparatus of claim 1, wherein said valve plate includes an inner side disposed toward said housing chamber and includes an intake passage extending from said intake bore to said inner side and includes an exhaust passage extending from said exhaust bore to said inner side, wherein said intake port of said intake valve disk selectively aligns with said intake passage when said intake valve disk rotates within said intake bore, and wherein said exhaust port of said exhaust valve disk selectively aligns with said exhaust passage when said exhaust valve disk rotates within said exhaust bore.

6. The rotary apparatus of claim 5, wherein said rotor shaft to which said intake valve disk is mounted comprises an intake rotor shaft and wherein said rotor shaft to which said exhaust valve disk is mounted comprises an exhaust rotor shaft, and wherein said intake valve disk is mounted to said intake rotor shaft for selective relative rotational movement of said intake valve disk with respect to said intake rotor shaft such that the rotational alignment of said intake port with said intake passage is adjustable by relative movement of said intake valve disk on said intake rotor shaft.

7. The rotary apparatus of claim 6, wherein said exhaust valve disk is mounted to said exhaust rotor shaft for selective relative rotational movement of said exhaust valve disk with respect to said exhaust rotor shaft such that the rotational alignment of said exhaust port with said exhaust passage is adjustable by relative movement of said exhaust valve disk on said exhaust rotor shaft.

8. The rotary apparatus of claim 1, wherein said sidewall of said intake bore includes a circumferential channel, and wherein said ring member of said intake valve disk extends into said channel of said intake bore, and wherein said sidewall of said exhaust bore includes a circumferential channel, and wherein said ring member of said exhaust valve disk extends into said channel of said exhaust bore.

9. The rotary apparatus of claim 8, wherein said valve plate comprises a first valve plate member and a second valve plate member, and wherein said first valve plate member and said second valve plate member cooperatively define said intake bore and said exhaust bore when mated together, and wherein said channels of said intake bore and said exhaust bore are disposed where said first valve plate member and said second valve plate member engage together.

10. The rotary apparatus of claim 1, wherein said rotary apparatus comprises an engine.

11. A rotary apparatus, said rotary apparatus comprising:
a housing defining a housing chamber;
four elliptical rotors, each one of said four elliptical rotors being mounted to a separate rotor shaft with said four elliptical rotors being rotatable within said housing chamber;
a first intake valve disk mounted to one of said rotor shafts comprising an intake rotor shaft for rotation therewith, said first intake valve disk including an intake port extending between a first side and a second side of said first intake valve disk;
a first exhaust valve disk mounted to another one of said rotor shafts comprising an exhaust rotor shaft for rotation therewith, said first exhaust valve disk including an exhaust port extending between a first side and a second side of said first exhaust valve disk;
a valve plate, said valve plate including a first intake bore for rotationally receiving said first intake valve disk therein with said first intake bore defining a cylindrical sidewall, said valve plate further including a first exhaust bore for rotationally receiving said first exhaust valve disk therein with said first exhaust bore defining a cylindrical sidewall;
said first intake valve disk and said first exhaust valve disk each including a radial edge wall with a groove disposed in said edge wall, and each including a ring member disposed in said grooves, said ring member of said first intake valve disk contacting said sidewall of said first intake bore when said first intake valve disk is disposed in said first intake bore, and said ring member of said first exhaust valve disk contacting said sidewall of said first exhaust bore when said first exhaust valve disk is disposed in said first exhaust bore;
wherein said valve plate includes an inner side disposed toward said housing chamber and includes a first intake passage extending from said first intake bore to said inner side and a first exhaust passage extending from said first exhaust bore to said inner side, wherein said intake port of said first intake valve disk selectively aligns with said first intake passage when said first intake valve disk rotates within said first intake bore, and wherein said exhaust port of said first exhaust valve disk selectively aligns with said first exhaust passage when said first exhaust valve disk rotates within said first exhaust bore.

12. The rotary apparatus of claim 11, wherein said intake rotor shaft and said exhaust rotor shaft are diagonally disposed with respect to one another and said other rotor shafts.

13. The rotary apparatus of claim 11, wherein said first intake valve disk is mounted to said intake rotor shaft for selective relative rotational movement of said first intake valve disk with respect to said intake rotor shaft such that the rotational alignment of said intake port with said first intake passage is adjustable by relative movement of said first intake valve disk on said intake rotor shaft, and wherein said first exhaust valve disk is mounted to said exhaust rotor shaft for selective relative rotational movement of said first exhaust valve disk with respect to said exhaust rotor shaft such that the rotational alignment of said exhaust port with said first exhaust passage is adjustable by relative movement of said first exhaust valve disk on said exhaust rotor shaft.

14. The rotary apparatus of claim 11, further including a second intake valve disk mounted to yet another said rotor shaft and including a second exhaust valve disk mounted to still another said rotor shaft;
wherein said valve plate includes a second intake bore for rotationally receiving said second intake valve disk therein with said second intake bore defining a cylindrical sidewall, and wherein said valve plate includes a second exhaust bore for rotationally receiving said second exhaust valve disk therein with said second exhaust bore defining a cylindrical sidewall, said second intake valve disk and said second exhaust valve disk each including a radial edge wall with a groove disposed in said edge wall, and each including a ring member disposed in said grooves, said ring member of said second intake valve disk contacting said sidewall of said second intake bore when said second intake valve disk is disposed in said second intake bore, and said ring member of said second exhaust valve disk contacting said sidewall of said second exhaust bore when said second exhaust valve disk is disposed in said second exhaust bore;
wherein said valve plate further includes a second intake passage extending from said second intake bore to said inner side and a second exhaust passage extending from said second exhaust bore to said inner side, wherein said intake port of said second intake valve disk selectively aligns with said second intake passage when said second intake valve disk rotates within said second intake bore, and wherein said exhaust port of said second exhaust valve disk selectively aligns with said second exhaust passage when said second exhaust valve disk rotates within said second exhaust bore.

15. The rotary apparatus of claim 14, wherein said first intake valve disk and said second intake valve disk are diagonally disposed with respect to one another and said rotor shafts.

16. The rotary apparatus of claim 14, wherein said first intake valve disk and said second intake valve disk are disposed adjacent to one another.

17. The rotary apparatus of claim 14, wherein said cylindrical sidewalls of each of said first intake bore, said second intake bore, said first exhaust bore and said second exhaust bore include a channel, and wherein said ring member of each of said first intake valve disk, said second intake valve disk, said first exhaust valve disk, and said second exhaust valve disk extend into respective ones of said channels.

18. A rotary engine, said rotary engine comprising:
a housing defining a housing chamber;

a plurality of elliptical rotors, each one of said plurality of elliptical rotors being mounted to a respective rotor shaft with said plurality of elliptical rotors being rotatable within said housing chamber;

at least one valve disk mounted to a respective one of said rotor shafts for rotation with said rotor shaft, said at least one valve disk having a first side and a second side with a port passing there between;

a valve plate, said valve plate including a bore for rotationally receiving said at least one valve disk therein with said bore defining a cylindrical sidewall;

said valve disk including a radial edge wall with a groove disposed in said edge wall, and including a ring member disposed in said groove, said ring member contacting said sidewall of said bore when said at least one valve disk is disposed in said bore;

wherein said at least one valve disk comprises an intake valve disk and another valve disk comprises an exhaust valve disk, and said port comprises an intake port on said intake valve disk, and wherein said bore comprises an intake bore for receiving said intake valve disk, said exhaust valve disk being mounted to another said rotor shaft for rotation there with, said exhaust valve disk having a first side and a second side with an exhaust port passing there between, said valve plate including an exhaust bore for rotationally receiving said exhaust valve disk therein with said exhaust valve bore defining a cylindrical sidewall, said exhaust valve disk including a radial edge wall with a groove disposed therein, and including another ring member disposed in said groove of said exhaust valve disk with said ring member of said exhaust valve disk contacting said sidewall of said exhaust bore when said exhaust valve disk is disposed in said exhaust bore, and wherein said valve plate includes an inner side disposed toward said housing chamber and includes an intake passage extending from said intake bore to said inner side and includes an exhaust passage extending from said exhaust bore to said inner side, wherein said intake port of said intake valve disk selectively aligns with said intake passage when said intake valve disk rotates within said intake bore, and wherein said exhaust port of said exhaust valve disk selectively aligns with said exhaust passage when said exhaust valve disk rotates within said exhaust bore, and wherein said valve plate is mounted to said housing and said intake passage angles inwardly from said intake bore toward said inner side of said valve plate and said exhaust passage angles inwardly from said exhaust bore toward said inner side of said valve plate, with said intake passage and said exhaust passage angling toward a center of said housing chamber.

19. The rotary engine of claim 18, wherein a plug plate is mounted to said housing on a side opposite said valve plate, and wherein one of a spark plug or a glow plug are mounted to said plug plate.

20. The rotary engine of claim 18, wherein said rotor shaft to which said intake valve disk is mounted comprises an intake rotor shaft and wherein said rotor shaft to which said exhaust valve disk is mounted comprises an exhaust rotor shaft, and wherein said intake valve disk is mounted to said intake rotor shaft for selective relative rotational movement of said intake valve disk with respect to said intake rotor shaft such that the rotational alignment of said intake port with said intake passage is adjustable by relative movement of said intake valve disk on said intake rotor shaft, and wherein said exhaust valve disk is mounted to said exhaust rotor shaft for selective relative rotational movement of said exhaust valve disk with respect to said exhaust rotor shaft such that the rotational alignment of said exhaust port with said exhaust passage is adjustable by relative movement of said exhaust valve disk on said exhaust rotor shaft.

* * * * *